Dec. 9, 1941.   R. BECK   2,265,888
LIQUID LEVEL INDICATOR
Filed Dec. 29, 1939
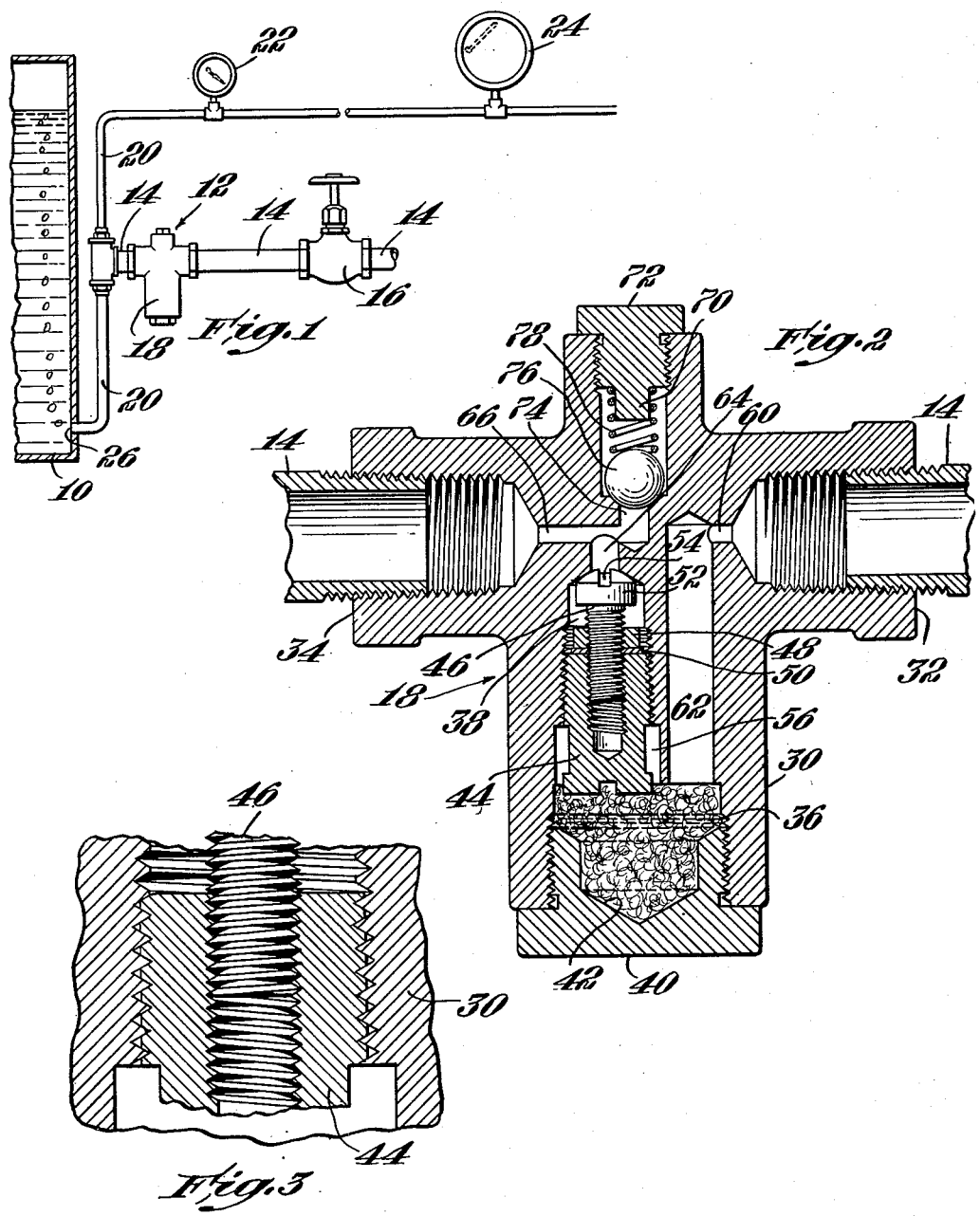
Inventor
Rudolf Beck
by Roberts, Cushman & Woodbury
attys Patented Dec. 9, 1941

2,265,888

UNITED STATES PATENT OFFICE 2,265,888

LIQUID LEVEL INDICATOR

Rudolf Beck, Fairfield, Conn., assignor to Manning, Maxwell & Moore, Incorporated, New York, N. Y., a corporation of New Jersey Application December 29, 1939, Serial No. 311,476

7 Claims. (Cl. 137—69)

This invention relates to an improvement in a liquid level indicator, and more particularly in that type of indicator commonly known as the bubble type.

An indicator of the bubble type by which the level of a liquid in a tank or other container is measured comprises a sounding pipe through which a small stream of compressed air is introduced under pressure into the tank through an opening near the bottom thereof. The air so introduced rises to the surface of the liquid in the form of bubbles. The pressure necessary to force the air stream through the pipe into the tank is obviously equivalent to the head of the liquid at the point of introduction and can readily be indicated upon a suitable gauge or gauges. Such gauge or gauges may be calibrated so as directly to indicate the liquid head or to indicate the level of the liquid in the tank.

While such an indicator gives accurate information and has been widely used with success, it is open to objection due to the fact that the continuous feeding of the stream of air under pressure represents a continuous expense which must be held to a minimum. Usually the air pressure is throttled down from the supply pressure to the desired liquid head pressure by the use of an orifice of the needle valve type. A suitable air flow is from 0.02 to 0.10 cubic feet per minute, and assuming the supply pressure to be 120 pounds per square inch, an orifice of 0.004 to 0.009 inch in diameter is required. Such an orifice is clogged very easily, not by solid particles which can be removed by filtering, but by the vapors of oil or the like which are emitted from the lubricating oil used in the compressor and are picked up by the air. As the air flowing through the orifice expands it of course cools and precipitates the oil upon the walls of the orifice. The oxygen in the air oxidizes this precipitated oil forming a black precipitate or deposit which gradually closes the orifice.

The primary object of this invention is to provide an orifice which will not be closed by this unavoidable precipitate except possibly after a much longer period of use than the orifices previously employed. Specifically such orifice provides a long tapering passage for the air so that it expands gradually over a considerable distance and as the air is for a long time in contact with the warmer surrounding metal, the cooling effect of the orifice is reduced and less oil vapor will be condensed and less black precipitate deposited therein. Moreover, the orifice is much larger in cross section at the receiving end where most deposits are formed than at the discharge end; and the deposit is distributed over a large area so that it will take a long time before the layer of deposit formed is of sufficient size to obstruct seriously the flow of air.

A further object of this invention is to provide an orifice assembly in which the orifice is formed in part by a readily removable element so that the orifice can be quickly and easily cleaned, and such element is so constructed that, when it is replaced, the flow of air originally prescribed for such orifice is restored without the necessity for careful tests or experiments.

Another object is to provide, in combination with the orifice-forming elements, means by which the air pressure is held at all times below that amount which would injure the indicating gauge or gauges.

These and other objects of the invention will appear from a consideration of the following description and of the accompanying drawing which forms a part thereof and in which Fig. 1 illustrates a typical installation of a liquid level indicator embodying this invention;

Fig. 2 is a longitudinal section of the orifice unit of such installation; and

Fig. 3 is an enlarged view in cross section illustrating the formation of the orifice through which the air stream flows.

In Fig. 1 the reference numeral 10 designates a tank containing liquid, the level of which is to be determined by the indicator device of the present invention. This indicator device comprises a pipe 14 through which air under pressure is delivered from a compressor or other source of supply (not shown), a control valve 16, an orifice unit 18, a conduit 20, preferably and usually a copper tube, and gauges 22 and 24. The conduit 20 enters the tank through an opening 26 in its wall near the bottom thereof, and when the indicator is in use the air stream entering the tank rises to the surface of the liquid in the tank in the form of bubbles 28.

The orifice unit 18 of the present invention (Fig. 2) comprises a body casing 30 here shown (Fig. 2) as of cruciform contour in vertical section, said casing, having an inlet passage 32 in one horizontal arm, an outlet passage 34 in the other horizontal arm, an inlet chamber 36 in its lower arm, the lower part of which, may if desired constitute a filter chamber, an orifice chamber 38 also within the lower arm, and a relief valve chamber 70 in the upper arm of the casing.

The filtering chamber when used, contains any suitable material by which dust and other solid particles is removed from the air stream. The lower end of chamber 36 is closed by a cap 40 having a pocket 42 which acts as a continuation of the chamber 36.

Mounted in the orifice chamber 38 is a cylindrical plug 44. The chamber tapers slightly inwardly and the wall thereof is internally threaded with a standard pipe thread. The plug 44 is externally threaded with the same standard pipe thread. The thread, however, is tapered, while the plug is cylindrical, and as a result the thread formed on the plug is incomplete. Hence while the base portion of the thread on the plug is continuous so that it receives and meshes with the thread on the chamber wall, a spiral channel is produced between the plug and wall.

This channel is continuous and tapers gradually from practically the full cross section of the thread at the inlet end to a very fine opening at the outlet end where the thread on the plug is most nearly complete. By rotating the plug 44 the effective size of the spiral channel is obviously varied. Thus any desired adjustment of the channel can be made without, however, impairing the gradually tapering characteristic of the channel. In order to maintain the adjustment and insure its restoration when the plug 44 has been removed, a set screw 46 is inserted in the center of the plug from its inner end and locked in place by means of a nut 48 and lock washer 50. The head 52 having a slot 54 therein rests against the inner end of the chamber 38 when the plug is in the desired position. The butt of the plug 44 is recessed to provide an annual space 56 leading from the filter chamber 36 to the spiral channel described above.

A continuous passage for the air stream through the unit is provided from the inlet 32, through passages 60, 62, chamber 36, annular space 56 and spiral channel in chamber 38, slot 54 and passages 64, 66 to the outlet 34. The air flow to the conduit 20 is controlled by the setting of the plug 44 which forms the spiral channel as described above.

While such channel is not as easily clogged as the old type of orifice, the oil deposits on the walls thereof do gradually reduce the air flow and must from time to time be removed. The cleaning of the channel can be easily performed by removing the cap 40, thus affording access to the plug 44 which is then taken out. The deposits on the plug 44 and the threads in the casing are removed and the plug 44 and cap 40 returned to their former positions. The plug 44 is advanced into the chamber 38 until the head 52 of the set screw 46 rests against the inner end of the chamber, whereupon the original setting is restored.

Should the outlet of the conduit or tube 20 be blocked, as by ice, the pressure of the air stream will, of course, increase greatly and, unless a relief valve were provided in the line, the air pressure would rise enough to ruin the gauges 22 and 24. Such a relief valve is here shown as an element of the unit 18. In the body casing 30 is formed the chamber 70 normally closed by a removable cap 72 and connected by a port (not shown) with the outer atmosphere. The chamber 70 is connected to the passage 66 by a passage 74, the upper end of which forms a valve seat which is normally closed by a ball 76 held in position by a spring 78. The spring 78 is so dimensioned, that when the pressure in the line reaches a predetermined amount, the spring will permit the ball to rise, and prevent further increase in pressure in the line.

While one embodiment of the invention has been shown and described, it will be understood that the invention is not limited thereto and that either changes in the present embodiment or other embodiments may be made without departing from the spirit and scope of the invention as set forth in the following claims.

I claim:

1. In a liquid level indicator of the bubble type, an air control unit constructed and arranged to provide a spiral tapering channel through which air is passed under pressure, said channel being formed in a tapered orifice chamber between the wall thereof and a cylindrical plug, said wall and said plug being provided with tapered threads which mesh, none of the threads on the plug being complete, and a set screw carried by said plug, the head of which screw is adapted to engage the wall of the orifice chamber when the plug has taken the desired position therein, said screw head having therein a duct providing communication between the orifice chamber and an outlet passage in the chamber wall.

2. In a liquid level indicator of the bubble type, a unit comprising a casing having a tapered internally threaded chamber therein, a cylindrical plug in said chamber, the wall of which is correspondingly threaded to mesh with the threads of the chamber but none of the threads of the plug being complete whereby a spiral channel of gradually decreasing cross-sectional area is formed through which air is passed under pressure.

3. A liquid level indicator of the bubble type including an air-control unit constructed and arranged to provide a channel through which air delivered under pressure flows from an inlet to an outlet passage, said channel being defined by the wall of an internally screw-threaded tapering orifice chamber and an externally screw-threaded rotatable plug whose thread engages the thread on the wall of the chamber, said engaging threads being so designed and arranged as to form a spiral air duct which gradually decreases in cross-sectional area from its entrance toward its discharge end, the plug being removable from the chamber to facilitate cleaning said duct, and means operative to insure resetting of the plug in its original position in the chamber when reassembling the parts after cleaning said discharge, said means being so designed and arranged as to permit free flow of air from the discharge end of the duct into the outlet passage.

4. A liquid level indicator of the bubble type comprising a part having therein an elongate bore whose wall is screw threaded, and a removable externally screw-threaded plug normally disposed in said bore, the screw threads on the plug and on the wall of the bore being so devised and arranged as to define a spiral air passage which gradually tapers from its entrance towards its discharge end, the plug being removable from the bore to facilitate cleaning the passage and being rotatable in the bore thereby to vary the transverse area of the passage, and adjustable stop means operable to determine the position of the plug in the bore.

5. In a liquid level indicator of the bubble type, an air control unit comprising a casing of cruciform contour in vertical section, one horizontal arm of the casing having therein an inlet passage and the other horizontal arm having an outlet passage therein, the lower arm of the casing being hollow and normally closed at its lower end by a removable cap having therein a pocket within which is disposed filtering material, said hollow lower arm including an inlet chamber which communicates at one end with the inlet passage and whose other end is defined by the filtering material, said lower arm also having therein an orifice chamber whose lower end is defined by said filtering material and whose upper end communicates with a relief valve chamber in the upper arm of the casing and also said outlet passage, and means within the orifice chamber providing a spiral tapering channel through which air under pressure is passed, said channel being formed between a tapering wall of the orifice chamber and a cylindrical plug, said wall and plug being provided with tapered threads which mesh, none of the threads on the plug being complete, and means for determining the position of the plug in the chamber.

6. In a liquid level indicator of the bubble type, an air control unit comprising a casing of cruciform contour in vertical section, one horizontal arm of the casing having therein an inlet passage and the other horizontal arm having an outlet passage therein, the lower arm of the casing being hollow and normally closed at its lower end by a removable cap having therein a pocket within which is disposed filtering material, said hollow lower arm including an inlet chamber which communicates at one end with the inlet passage and whose other end is defined by the filtering material, said lower arm also having therein an orifice chamber whose lower end is defined by said filtering material and whose upper end communicates with a relief valve chamber in the upper arm of the casing and also with the outlet passage, said orifice chamber tapering from its lower toward its upper end and being internally threaded with a standard pipe thread, and a cylindrical plug also threaded with the same standard pipe thread, said plug being disposed within said orifice chamber, none of the threads on the plug being complete whereby a spiral tapering channel is provided through which air under pressure is passed, and adjustable stop means carried by the plug for determining the normal position of the plug in the orifice chamber.

7. In a liquid level indicator of the bubble type, an air control unit comprising a casing which is cruciform in vertical section, one horizontal arm of the casing having therein an inlet passage and the other horizontal arm having therein an outlet passage, the lower arm of the casing being hollow and normally closed at its lower end by a removable cap, the cap having a pocket in its upper surface and a body of filtering material disposed within said pocket, the upper arm of the casing having therein a relief valve chamber communicating at its upper part with the atmosphere and at its lower part with the outlet passage, a spring loaded relief valve normally closing communication between the upper and lower parts of said relief valve chamber, the hollow lower arm of the casing having therein inlet and outlet chambers whose lower ends are defined by the filter material, the upper end of the inlet chamber communicating with the inlet passage and the upper end of the outlet chamber communicating with the outlet passage, and means within the orifice chamber defining a helical passage through which air is passed under pressure, said passage gradually diminishing in transverse section from its lower toward its upper end.

RUDOLF BECK.